June 26, 1923.

G. H. F. HOLY

FLEXIBLE GEAR

Filed Dec. 31, 1921

WITNESSES:

INVENTOR
George H. F. Holy,
BY
ATTORNEY

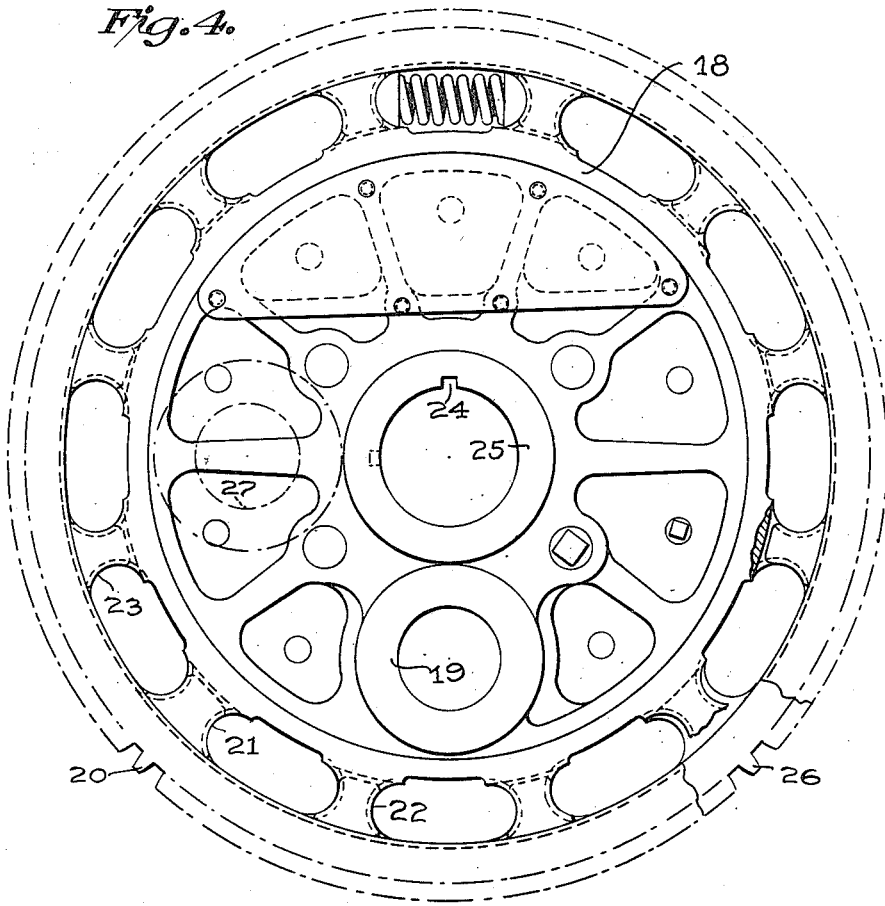

Patented June 26, 1923.

1,460,131

UNITED STATES PATENT OFFICE.

GEORGE H. F. HOLY, OF PITTSBURGH, PENNSYLVANIA, ASSIGNOR TO WESTERN ELECTRIC & MANUFACTURING COMPANY, A CORPORATION OF PENNSYLVANIA.

FLEXIBLE GEAR.

Application filed December 31, 1921. Serial No. 526,137.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Flexible Gears, of which the following is a specification.

My invention relates to gear wheels, more especially to gear wheels which constitute elements of the driving mechanisms between the motors and the driving wheels of electric railway vehicles.

It is among the objects of this invention to provide a gear-wheel construction which shall permit of positive alignment between the intermediate or resilient gear and the motor pinions.

It is a further object of my invention to provide gear wheels of this general type which shall be so designed as to permit of positive and fool-proof mounting of the rim of the intermediate gear with respect to the gear hub and the crank-pin support.

It is a still further object of this invention to provide a gear-driving mechanism which shall be of simple construction and which may be readily assembled on the drive shafts in suitable alignment with the motor pinions to be readily accessible.

It has been a customary practice to mount the jackshaft in the bearing journals of the locomotive side frames or special motor-frame construction, assemble the intermediate gears on both ends thereof, then mount a motor on one or both sides of the jackshaft and line up the motor pinions so that the teeth will be in alignment with the teeth of the jackshaft gears. This has been accomplished in various ways, as by marking a center tooth of the two jackshaft gears to correspond to the seats or key ways of the gear hubs, which are in alignment with each other, and by marking the corresponding motor pinions to provide a locating point for mounting them on their respective motor shafts, so that, when the gears are assembled they will be in alignment on both ends of the motor and jackshafts and readily fit in their proper positions.

In my present invention, I provide a gear construction of a special type which may be mounted on the jackshaft in only one position to assure the alignment of a single tooth in suitable relation to the key seat of the gear hub. This greatly facilitates the assembling of the gear members and avoids any possibility of error so that even an unskilled workman may be able to assemble the respective gears with no difficulty.

In the accompanying drawings constituting parts hereof and in which like reference characters designate like parts, Figure 1 is a side elevational view of a flexible gear wheel made in accordance with this invention;

Fig. 4 is a side elevational view of a flexible gear wheel of the type embodying a crank-pin support.

Figure 1:
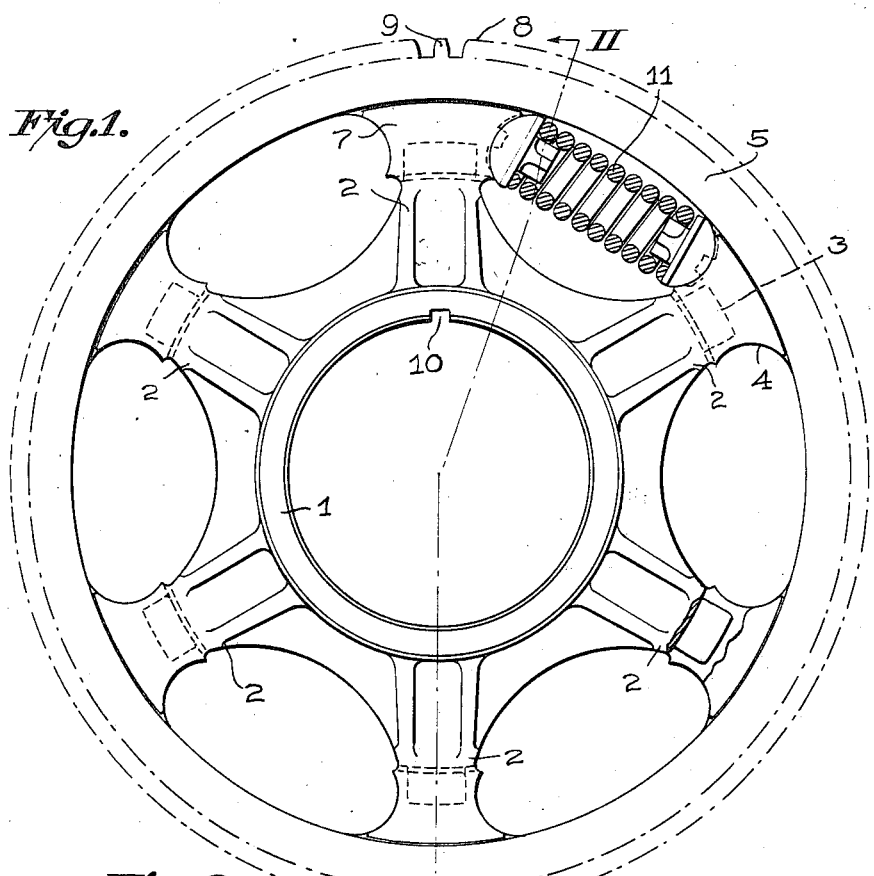
Figure 2:
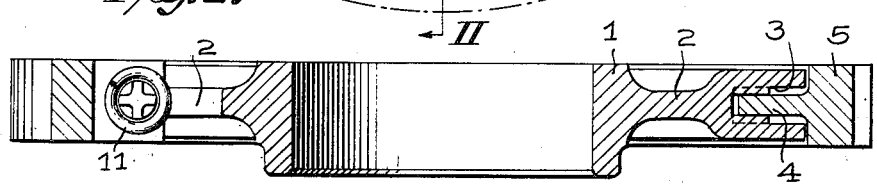
Fig. 2 is a cross-sectional view thereof along the line II—II of Fig. 1.

The gear wheel (Fig. 1) consists of a hub 1 having a plurality of radial spokes 2 projecting therefrom, the ends of which are provided with slots 3 for registering with a plurality of depending lugs 4 of a gear rim 5. One of the spokes and the co-operating lug 7 are of greater size than the others and are provided with correspondingly larger engaging surfaces 3 and 4 so that it will be impossible to assemble the gear rim and hub until these members are made to register. The object of this construction is to provide a specific relation between the hub member 1 and the gear rim 5 so that, by machining the gear teeth 8 with the tooth 9 cut central with the depending lug 7 and the key seat 10 cut central with the spoke 6, a central alignment of the tooth 9 with the key seat 10 is assured.

When the gear hub and the rim are assembled, as shown in Fig. 1, a plurality of resilient members 11 are mounted between the successive spokes to provide a cushioning effect betwen the jackshaft, on which the gear hub is mounted, and the gear teeth.

It is apparent that a gear wheel of this type produces an accurate alignment of one tooth with another when two such gears are mounted at opposite ends of a common jackshaft, provided the key seats on the jackshaft are in alignment.

Figure 3:
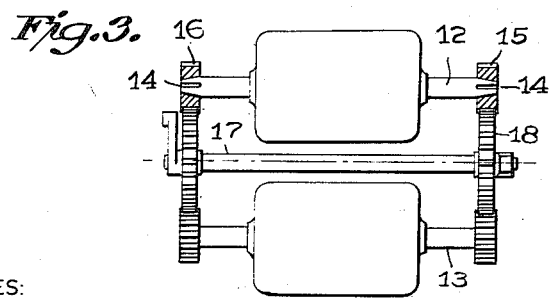
Fig. 3 is a top plan view of a motor-drive assembly showing the relative positions of the motors with respect to the jackshaft.

In assembling the gears, motor shafts 12 and 13 (Fig. 3) are provided, at their ends, with key seats 14 in alignment with each other so that, when the pinions 15 and 16, which severally have one of their teeth formed central with their key seats, are mounted on the shaft, they will be in alignment. The intermediate gears (Fig. 1) when mounted on the jackshaft will have their teeth in alignment so that they will register with the teeth of the motor pinions.

In the gear 18 (Fig. 4), which is provided with a crank-pin support 19, a gear tooth 20 is machined central with a lug 21, which is of larger size than the lugs 22, 23 and the like, for the reasons mentioned above. The key seat 24 in the gear hub 25 is cut central with the crank-pin support 19 which provides a 45 degree lead between the central tooth 20 and the key seat 24.

In electric locomotive drives, it is customary to have the cranks on the ends of the jackshaft 90 degrees apart, so that one crank will lead the other. The gears 18 are assembled on the ends of the jackshaft 17 so that the crank pin supports 19 will be in alignment. This will bring the center tooth 26 of the far side gear 90 degrees from the center tooth 20 of the near side gear and, by bringing the tooth 26 in alignment with the tooth 20, the crank-shaft-pin support 27 on the far side gear will be advanced 90 degrees, as shown by the dotted line. In actual practice, it will be necessary to machine the key seat of the jackshaft at a 90 degree relation on opposite ends and, by mounting the gear hubs 25 on the keys of the shaft 17, the crank-pin supports will automatically register 90 degrees apart.

It will be readily seen from the above description of my invention that a gear designed in accordance therewith will provide a ready means of assembling jackshaft and motor gears in alignment with each other, in definite relation to each other and their respective seats.

Although I have described a specific embodiment of my invention, it will be obvious to those skilled in the art that various modifications may be made in accordance therewith without departing from the principles herein set forth. For instance, the method of aligning the gear rim with a hub may be accomplished in various ways, as by providing a key seat in the gear rim and a corresponding projection, or lug, on the gear hub to register, or by providing other shaped off-set portions of the rim and hub members, or of the hub spokes and gear-rim lugs.

I claim as my invention:

1. A flexible gear comprising a gear hub provided with a plurality of radial spokes projecting therefrom, a gear rim having a plurality of inwardly depending lugs in alignment with said spokes, one of said spokes and one of said lugs being of different shape from the others, said hub and rim having a key seat and gear tooth, respectively, in central alignment therewith.

2. A flexible gear comprising a gear hub provided with a plurality of radial spokes projecting therefrom, a gear rim having a plurality of inwardly depending lugs in alignment with said spokes, resilient members mounted between successive depending lugs and spokes, one of said spokes and one of said lugs being of different shape from the others, said hub and said rim having a key seat and a gear tooth, respectively, in central alignment therewith.

3. The combination with a drive shaft, of a flexible gear mounted on each end thereof, said gears comprising a gear hub having a plurality of radially projecting spokes, a gear rim having a plurality of inwardly depending lugs in alignment with said spokes, a plurality of resilient members mounted between successive lugs and spokes, one of said spokes and one of said lugs being of different shape from the others, said hub and rim having a key seat and a gear tooth, respectively, in central alignment therewith, and having the aligned tooth and key seat of one gear in alignment with a tooth and key seat of the other gear.

4. The combination with a drive shaft, of a flexible gear mounted on each end thereof, said gears comprising a gear hub having a plurality of radially projecting spokes and a crank-pin support, a gear rim having a plurality of inwardly depending lugs in alignment with said spokes, a plurality of resilient members mounted between successive lugs and spokes, one of said spokes and one of said lugs being of different shape from the others, said crank-pin support and rim having a key seat and a gear tooth in definite alignment therewith, and having the aligned tooth of one gear in alignment with a tooth and key seat of the other gear.

In testimony whereof, I have hereunto subscribed my name this 23rd day of December, 1921.

GEORGE H. F. HOLY.